(12) United States Patent
Solem

(10) Patent No.: US 8,997,491 B2
(45) Date of Patent: Apr. 7, 2015

(54) POWER GENERATION SYSTEM

(75) Inventor: Sigurd Solem, Gredstedbro (DK)

(73) Assignee: Yellow Shark Holding ApS, Gredstedbro (DK)

( * ) Notice: Subject to any disclaimer, the term of this patent is extended or adjusted under 35 U.S.C. 154(b) by 228 days.

(21) Appl. No.: 13/818,221

(22) PCT Filed: Aug. 29, 2011

(86) PCT No.: PCT/DK2011/050323
§ 371 (c)(1),
(2), (4) Date: Feb. 21, 2013

(87) PCT Pub. No.: WO2012/028149
PCT Pub. Date: Mar. 8, 2012

(65) Prior Publication Data
US 2013/0152578 A1 Jun. 20, 2013

(30) Foreign Application Priority Data
Aug. 31, 2010 (DK) .................................. 2010 00774

(51) Int. Cl.
*F01K 25/08* (2006.01)
*F01K 13/02* (2006.01)
*F03G 7/06* (2006.01)
*F01K 25/02* (2006.01)
*F01K 25/10* (2006.01)
*F03G 7/04* (2006.01)

(52) U.S. Cl.
CPC . *F03G 7/06* (2013.01); *F01K 25/02* (2013.01); *F01K 25/10* (2013.01); *F03G 7/04* (2013.01); *Y02E 10/10* (2013.01)

(58) Field of Classification Search
USPC .................... 60/651, 671, 660–667
See application file for complete search history.

(56) References Cited

U.S. PATENT DOCUMENTS

| | | | |
|---|---|---|---|
| 3,375,664 A | 4/1968 | Wells, Jr. | |
| 4,142,108 A * | 2/1979 | Matthews | 290/1 R |
| 4,157,014 A | 6/1979 | Clark, Jr. | |
| 4,232,992 A | 11/1980 | Possell | |
| 4,402,183 A * | 9/1983 | Dimitroff et al. | 60/660 |
| 4,576,007 A * | 3/1986 | Arakawa et al. | 60/660 |
| 4,955,200 A * | 9/1990 | Viscovich et al. | 60/667 |
| 4,996,846 A * | 3/1991 | Bronicki | 60/641.2 |

FOREIGN PATENT DOCUMENTS

| | | |
|---|---|---|
| DE | 42 01 975 A1 | 7/1993 |
| DE | 102 34 568 A1 | 2/2004 |

* cited by examiner

*Primary Examiner* — Hoang Nguyen
(74) *Attorney, Agent, or Firm* — Roberts Mlotkowski Safran & Cole, P.C.; David S. Safran

(57) ABSTRACT

A power generation system in which a thermally expandable fluid, e.g., R134a, $CO_2$, is circulated in a loop between a first location and a second location, the second location being at a higher elevation than the first location. The fluid is heated at the first location to expand it, so that it rises to the second location where it is cooled and contracted. The cooled fluid, being denser, then falls back to the first location under hydrostatic pressure, causing a circular fluid flow. This flow is used to generate power in a power transfer system. The system is regulated so that the fluid does not flash to a vapor, i.e., the fluid does not change state, which improves the efficiency of the system. The system is suitable for use in any situation where a height difference exists, and is particularly suited for geothermal heating sources.

10 Claims, 2 Drawing Sheets

POWER GENERATION SYSTEM

BACKGROUND OF THE INVENTION

1. Field of the Invention

The present invention relates to a power generation system, in particular, a generation system based on a pressure differential.

2. Description of Related Art

Increased fossil fuel costs, as well as a growing preference for renewable sources of energy, have led to considerable developments in the area of renewable power generation. While most of the focus has been on the traditional sources of renewable energy, e.g., wind power, solar power, tidal power, etc., other natural phenomena have also been utilized to provide alternative sources for power generation.

U.S. Pat. No. 4,157,014 in the name of Clark describes a differential pressure system for generating power. The system of Clark comprises a pair of connected vertical columns filled with a thermally expandable fluid. At the lower ends of the columns, a heat source is provided, while at the upper end of the columns, a heat sink is provided between the columns. As the heat source heats the fluid at the lower end of one of the columns, the fluid expands, and rises up the column. At the top of this column, the fluid passes through the heat sink, which acts to cool the fluid. The cooled fluid contracts, and this relatively dense fluid flows down the second column to the lower end, where it is again heated by the heat source.

This behavior results in a circular flow of fluid between the columns, with the height difference between the upper and lower ends of the columns acting to drive the fluid around in a circular loop. A power transfer system (e.g., a turbine) is provided between the upper ends of the columns and the motion of the fluid drives this power transfer system to generate power, which can be transmitted for external use. Such a system can be used, for example, in conjunction with a geothermal heat source, as a way to extract useful work from a natural phenomenon.

However, a problem with the system of Clark is that it operates with low efficiency. Once fluid passes through the power transfer system, it will flash to a vapor or steam. For the Clark system to operate successfully, this vapor must undergo a change of state back to the original fluid. Such a state change requires additional energy, and results in an energy loss in the system. Accordingly, the system as described in Clark suffers from a relatively low efficiency rating.

SUMMARY OF THE INVENTION

It is an object of the invention to provide a differential pressure system for generating power having improved efficiency.

Accordingly, there is provided a power generation system comprising:

a heat source provided at a first location;

a heat sink provided at a second location, wherein the second location is elevated relative to the first location;

first fluid communication means extending from the heat sink to the heat source;

a power transfer system in fluid communication with the heat sink; and second fluid communication means extending from the heat source to the power transfer system, wherein the fluid communication means are operable to circulate a thermally expandable fluid in a loop between the first and second locations, the fluid circulated from the first location, where it is heated and expanded by the heat source, in an upwards direction through the second fluid communication means to the second location, where it passes through the power transfer system and is cooled and contracted by the heat sink, and in a downwards direction through the first fluid communication means back to the first location, the circulation of the fluid operable to drive the power transfer system to generate power, wherein the power generation system further comprises a pressure regulation means that is operable to regulate a pressure difference experienced by the fluid at the power transfer system to prevent the fluid flashing to a vapor.

The thermal expansion of the heated fluid and the contraction of the cooled fluid cause a pressure differential to occur between the first and second fluid communication means. This, combined with the hydrostatic pressure acting on the cooled fluid at the top of the first fluid communication means, causes a circular fluid flow in the system, which can be harnessed by the power transfer system to generate power. The pressure difference at the power transfer system refers to the pressure difference experienced by the thermally expandable fluid (or working fluid) in the region of the power transfer system—e.g., the difference in pressure between the input and the output of the power transfer system, back pressure effects, etc. As the thermally expandable fluid is prevented from flashing to vapor through regulation of the pressure experienced, this prevents any changes of state in the system, and maintains the fluid in a single, preferably liquid, state. This reduces the energy consumed by the system itself, and accordingly increases the overall efficiency of the power generation system.

Preferably, the first fluid communication means and the second fluid communication means form a closed fluid communication circuit.

The upper ends of the first and second fluid communication means are coupled to one another through the power transfer system and the heat sink. As the system is a closed circuit (or closed loop), this means that a thermally expandable fluid may be recycled in the system, and not lost to the environment. Furthermore, the system may comprise at least one inlet valve, for the introduction of thermally expandable fluid into the system.

Preferably, the power transfer system is provided at the second location.

As the heat sink and the power transfer system are provided at the second location, this means that the majority of the components of the system are located at the same relative elevation, allowing for the heat source to be remotely located at the lower first location, e.g., a geothermal heat source.

Preferably, the pressure regulation means comprises at least one choke valve.

The use of a choke valve provides a low-cost mechanism for regulating pressure in the system, while also allowing for relatively easy operation.

Preferably, the choke valve is located at an inlet of the power transfer system, the choke valve operable to regulate the rate of fluid flow into the power transfer system from the second fluid communication means.

By controlling the rate of fluid flow into the power transfer system, the output flow from the power transfer system is accordingly limited, thereby controlling the pressure drop experienced by the fluid across the power transfer system.

In addition or alternatively, the choke valve is located at an outlet of the power transfer system, the choke valve operable to regulate the rate of fluid flow out of the power transfer system for communication to the heat sink.

As the output flow from the power transfer system is regulated, this allows for the pressure level of the fluid at the output of the power transfer system to be controlled, thereby reducing any backpressure effects to avoid bubbling and/or the flashing of the fluid to vapor.

Preferably, the pressure regulation means is operable to control the operation of the power transfer system to regulate the rate of fluid flow through the power transfer system.

By controlling the operation of the power transfer system, e.g., by controlling the throttling of the power transfer system, the pressure difference experienced across the power transfer system can be controlled and regulated.

Preferably, the pressure regulation means comprises at least one sensor and a controller, the pressure regulation means operable to detect the pressure level of a fluid in the power generation system.

The sensor may be any known pressure sensor, or any combination of sensor devices which may be used in combination to derive a pressure and/or temperature level in a fluid.

Preferably, the pressure regulation means comprises a first sensor and a second sensor provided at the inlet and outlet respectively of the power transfer system, the first and second sensors operable to detect a pressure difference between the inlet and the outlet of the power transfer system.

Preferably, the power transfer system comprises a volumetric turbine.

A volumetric turbine is a turbine which is driven by the differential pressure that exists between the upstream and downstream pressure zones on either side of the turbine, through the rate of flow of a fluid through the turbine. The turbine (which can also be a reversed piston pump) will always have a barrier between upstream and downstream pressure.

It will be understood that the power transfer system may be selected as any device suitable for generating power from a fluid flow, and is capable of being regulated to prevent a change of state of the fluid occurring. For example, the power transfer system may be selected from one of the following: a motor, reverse mono pump, or reverse operating volumetric compressor.

Preferably, the system further comprises at least one check valve operable to prevent reverse fluid flow in the system.

The check valve (or non-return valve) is preferably provided in the first fluid communication means, and acts to prevent fluid flow from the heat source in an upwards direction through the first fluid communication means. Additionally or alternatively, a check valve is provided in the second fluid communication means, to prevent downwards fluid flow in the second fluid communication means.

Preferably, the system further comprises a secondary choke provided in the first fluid communication means, the secondary choke operable to regulate the rate of flow of fluid from the second location to the first location.

In some cases, if the speed of descent of the cooled fluid from the second location to the first location is too high, a partial vacuum may be formed at the second location, after the heat sink. Subsequent expansion of fluid to fill this vacuum may result in damage to the fluid communication means, e.g., a collapsed pipe. The use of a choke in the first fluid communication means helps to regulate the speed of descent of the relatively heavy fluid, and prevent over speeding of the fluid.

Preferably, at least one of the first fluid communication means and the second fluid communication means comprises a substantially vertical conduit.

The use of a substantially vertical conduit for the first fluid communication means allows for the heated thermally expandable fluid to rise up the conduit without obstruction, improving the efficiency of the device, and reducing energy losses in the fluid flow due to friction. The use of a substantially vertical conduit for the second fluid communication means improves the effect of the hydrostatic pressure in forcing the cooled fluid downwards from the second upper location to the first lower location, and again reduces any frictional losses in the system.

Preferably, the system comprises a thermally expandable fluid.

The thermally expandable fluid may be any suitable fluid which has the characteristic of a reduction in density and/or an increase in volume in response to an increase in temperature, e.g., carbon dioxide ($CO_2$) in liquid form. Such a fluid may be any suitable known refrigerant, e.g., R134a, R245a, etc.

Preferably, the thermally expandable fluid is maintained in the liquid phase in the system.

As there are no state changes in the system, this reduces the heat loss due to re-conversion of a change of state, and accordingly improves the efficiency of the overall system.

As the second location is higher than the first location, it is preferred that the second location is at least 10 meters higher than the first location. For large-scale operations, preferably the second location is at least 1,000 meters higher than the first location.

Preferably, the heat source is operable to heat a thermally expandable fluid to a supercritical temperature of the fluid.

Preferably, the heat source is a geothermal heat source.

A geothermal heat source provides a reliable renewable source of heat energy.

Alternatively, the heat source is coupled with the heat sink, wherein heat energy received by the heat sink is supplied to heat the heat source.

In situations where it is possible to access the lower first location, the heat source can be provided using any suitable heating means, e.g., electric heating elements, fuel burners, etc. In this case, it is possible to re-use the induced heat when it is removed from the working fluid by the heat sink at the second upper location—this can be accomplished through utilising a secondary heat exchanger, having a second fluid communication loop extending from the heat sink to the heat source, wherein the heat extracted by the heat sink is re-supplied to the heat source. The installed heating means is then used only to replenish the heat lost in the system to heat exchangers, the piping, and to the environment.

Preferably, at least one of the first fluid communication means and the second fluid communication means is an oil well bore.

As oil well bores regularly extend to considerable depths, disused bores potentially provide pre-formed fluid communication means for a geothermal heat source.

Preferably, the system further comprises a pump, the pump operable to generate an initial fluid flow in the system.

In some cases, it may be necessary to initialize a circular fluid flow in the fluid communication means using a pump. Once the circular flow has been established, the pump may be disconnected from the system.

There is further provided a method for generating power, the method comprising the steps of:

(a) heating a thermally expandable fluid at a first location, to convey relatively lighter heated fluid in an upwards flow direction from the first location;

(b) driving a power transfer system using the fluid flow to generate power;

(c) cooling the fluid at a second location, the second location being elevated relative to the first location, the cooling acting to convey relatively denser cooled fluid in a downward flow direction from the second location to the first location, and (d) repeating steps (a)-(c) to circulate the fluid in a power generation loop, wherein the method further comprises the step of:

regulating a pressure difference experienced by the fluid at the power transfer system to prevent fluid flashing of the fluid to a vapor.

Embodiments of the invention will now be described, by way of example only, with reference to the accompanying drawings.

DETAILED DESCRIPTION OF THE INVENTION

Figure 1:
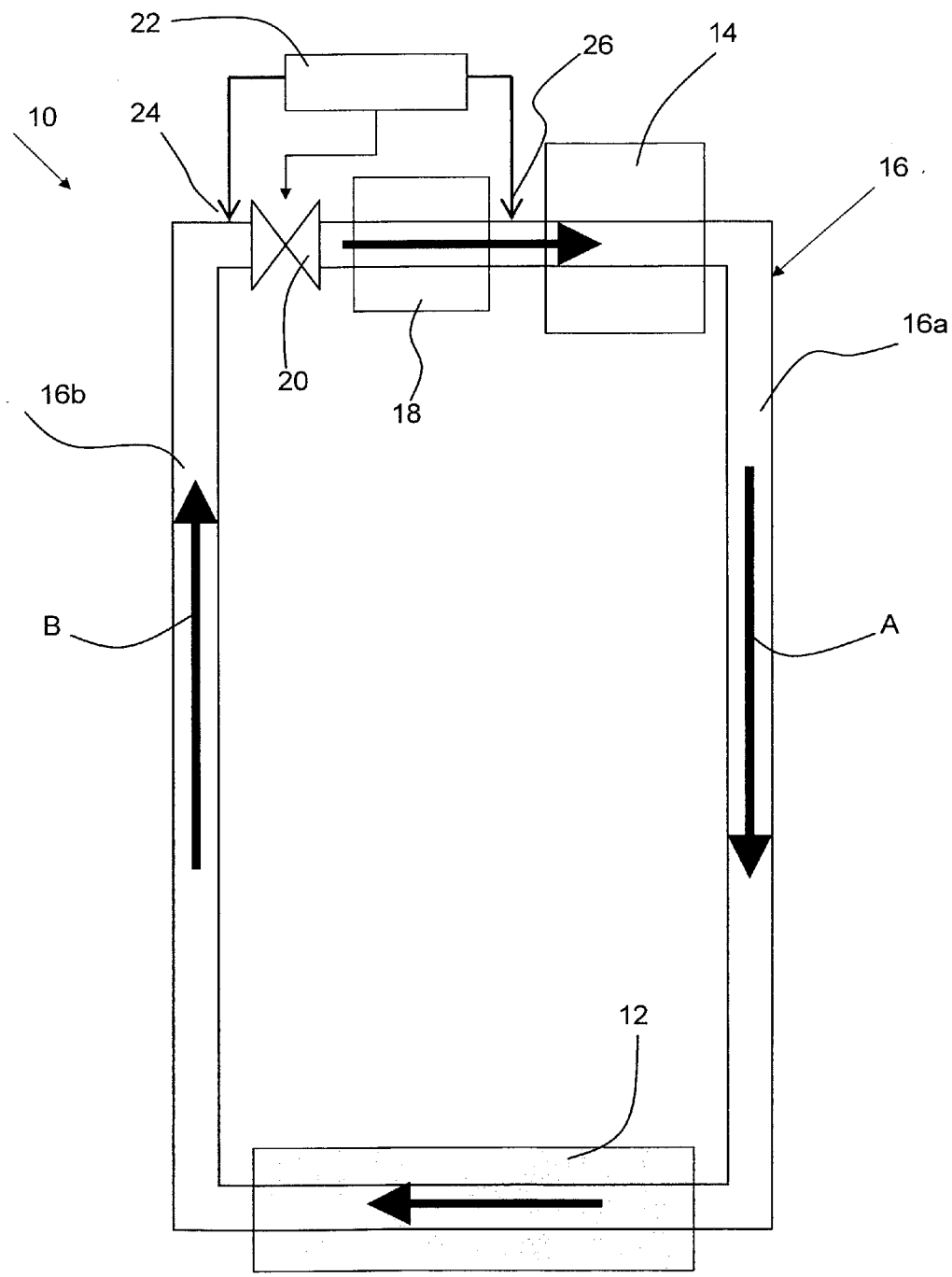
FIG. 1 is an illustration of a first embodiment of a power generation system according to a first embodiment of the invention.

With reference to FIG. 1, a first embodiment of a power generation system according to the invention is indicated generally at 10. The power generation system 10 comprises a heat source 12 and a heat sink 14, the heat sink 14 being positioned at a higher elevation level than the heat source 12.

The power generation system 10 further comprises a fluid communication circuit 16, the fluid communication circuit 16 comprising a first pipe 16a extending from an outlet of the heat sink 14 to an inlet to the heat source, and a second pipe 16b extending from an outlet of the heat source 12 and coupled to an inlet of the heat sink 14.

It will be understood that the term 'pipe' is used to refer to any fluid communication means suitable for conveying a fluid, e.g., insulated tubing, well bores, excavated channels, natural cavern formations, etc. Preferably, the fluid communication means are insulated, to prevent the loss of energy outside of the system.

It will also be understood that while the terms 'inlet' and 'outlet' are used, this does not limit the invention to the existence of distinct couplings between components, rather to demonstrate the boundaries between the different functional components of the system, e.g., the fluid communication circuit 16 may comprise a single length of uninterrupted tubing, which passes through locations suitable to perform the functions of a heat source e.g., a geothermal heat source, and/or a heat sink, e.g., a lake.

A thermally expandable fluid (the working fluid) is provided in the fluid communication circuit 16. The fluid chosen can be any fluid which has the characteristic of a reduction in density and/or volume in response to an increase in temperature, e.g., refrigerant fluid, such as R134a, R245a, carbon dioxide ($CO_2$) in liquid form; etc. When the fluid is cold, it is relatively dense, and when the fluid is heated, the fluid becomes less dense and expands in volume. The working fluid is preferably provided in liquid form.

The fluid is cooled by the heat sink 14, with the result that the cold, dense fluid provided at the top of the first pipe 16a sinks down to the lower elevation level (in the direction of arrow A), as a result of the hydrostatic force acting on the dense fluid. At the lower elevation level, the heat source 12 heats the fluid so that it expands and becomes less dense. As a result, the lighter, relatively hot fluid is pushed up the second pipe 16b to the upper elevation level (in the direction of arrow B) by the denser cold fluid falling down in the first pipe 16a. Once the hot fluid reaches the upper level, the fluid is cooled by the heat sink 14, and is contracted and denser. The dense, cooled fluid then falls down the first pipe 16a, thus resulting in a circulatory fluid flow in the fluid communication circuit 16.

The circulatory system operates on the basis of a volume/density change combined with a hydrostatic force caused by having a pair of interconnected columns that contain the working fluid. Essentially, the first pipe 16a comprises a column filled with a cold fluid having a high specific gravity, while the second pipe 16b comprises a column filled with a hot fluid having a low specific gravity. The heavy cold fluid sinks down and acts to displace the light hot fluid, forcing the light fluid upwards. As the cold fluid reaches the bottom, it is heated up, loosing specific gravity, and at the same time, expanding in volume according to the characteristics of the fluid. In its turn, the now heated fluid will be displaced by more cold fluid arriving from the upper level.

If required, a supplementary pump (not shown) may be employed in the fluid communication circuit 16 when the power generation system 10 is started, to initiate a circulatory fluid flow in the system 10. Once a flow is established, the pump may be removed from the system 10. Furthermore, a check valve (or non-return valve) may be utilized in the fluid communication circuit 16 (see, second embodiment below).

The power generation system 10 further comprises a power transfer system 18 located at the upper elevation level, the power generation system coupled to the heat sink 14. The power transfer system 18 is operable to harness the energy of the fluid flow in the fluid communication circuit 16, and to transform the energy into useful power which can be transferred for use elsewhere, e.g., electric power. The power transfer system 18 is generally provided such that the fluid communication circuit 16 flows through the power transfer system 18.

The power transfer system 18 may be any suitable device for converting fluid flow into electrical power, e.g., a volumetric turbine, a motor, a reverse mono pump, or a reverse operating volumetric compressor. A volumetric turbine is a turbine responsive to the volume of fluid flowing through the turbine. In the embodiment shown in FIG. 1, the power transfer system 18 is shown adjacent to the heat sink 14 at the upper elevation level. This allows for the majority of the components of the power generation system 10 to be located in substantially the same elevation, providing for ease of operation and servicing. However, it will be understood that the power transfer system 18 may be located at any location in the generation system 10, provided that operation of the entire system 10 is unaffected. Furthermore, the power transfer system 18 may be provided as integrated with the heat sink 14 itself.

The system 10 further comprises pressure regulation means in the form of a choke valve 20 provided adjacent the inlet to the power transfer system 18. A controller 22 is further provided, the controller operable to regulate the actuation of the choke valve 20. The controller 22 is communicatively coupled with pressure sensors 24, 26 provided in the fluid communication circuit 16, a first sensor 24 located at the upper level of the second pipe 16b, before the choke valve 20, and a second sensor 26 located at the outlet of the power transfer system 18.

The controller 22 is operable to measure the pressure level detected in the system by the pressure sensors 24, 26, and can derive the pressure difference experienced by the working fluid between the inlet and the outlet of the power transfer system 18. If the pressure of the working fluid falls below a certain level, then the working fluid will flash to a vapor on exiting the power transfer system 18. A considerable level of energy would have to be spent in changing the state of the working fluid back to liquid state (i.e., condensing the fluid)—this energy would then be lost to the system, and unrecoverable.

In order to eliminate such energy loss, and to improve the efficiency of the generation system 10, the controller 22 is operable to control the operation of the choke valve 20 to regulate the rate of fluid flow through the power transfer system 18, and consequently the pressure difference experienced by the working fluid at the power transfer system 18. Through careful regulation of the fluid flow and monitoring of the pressure detected at sensors 24, 26, it is possible to prevent the working fluid from undergoing a change of state, i.e., flashing to a vapor. Consequently, no energy is lost to the system due to relatively costly changes-of-state, and the overall efficiency of the power generation system 10 is improved.

Other modification of the pressure regulation means may be employed, for example, a second choke valve (not shown) may be employed adjacent the outlet of the power transfer means 18, this second choke valve operated by the controller 22 in a similar manner to the first choke valve 20, to regulate the pressure difference at the power transfer system 18 so that the working fluid does not flash to vapor. Such a choke valve can be used to maintain required back pressure in the power transfer system 18, and to prevent any bubbling of the working fluid. This second choke valve may be used in addition to, or as an alternative to, the first choke valve 20.

Figure 2:
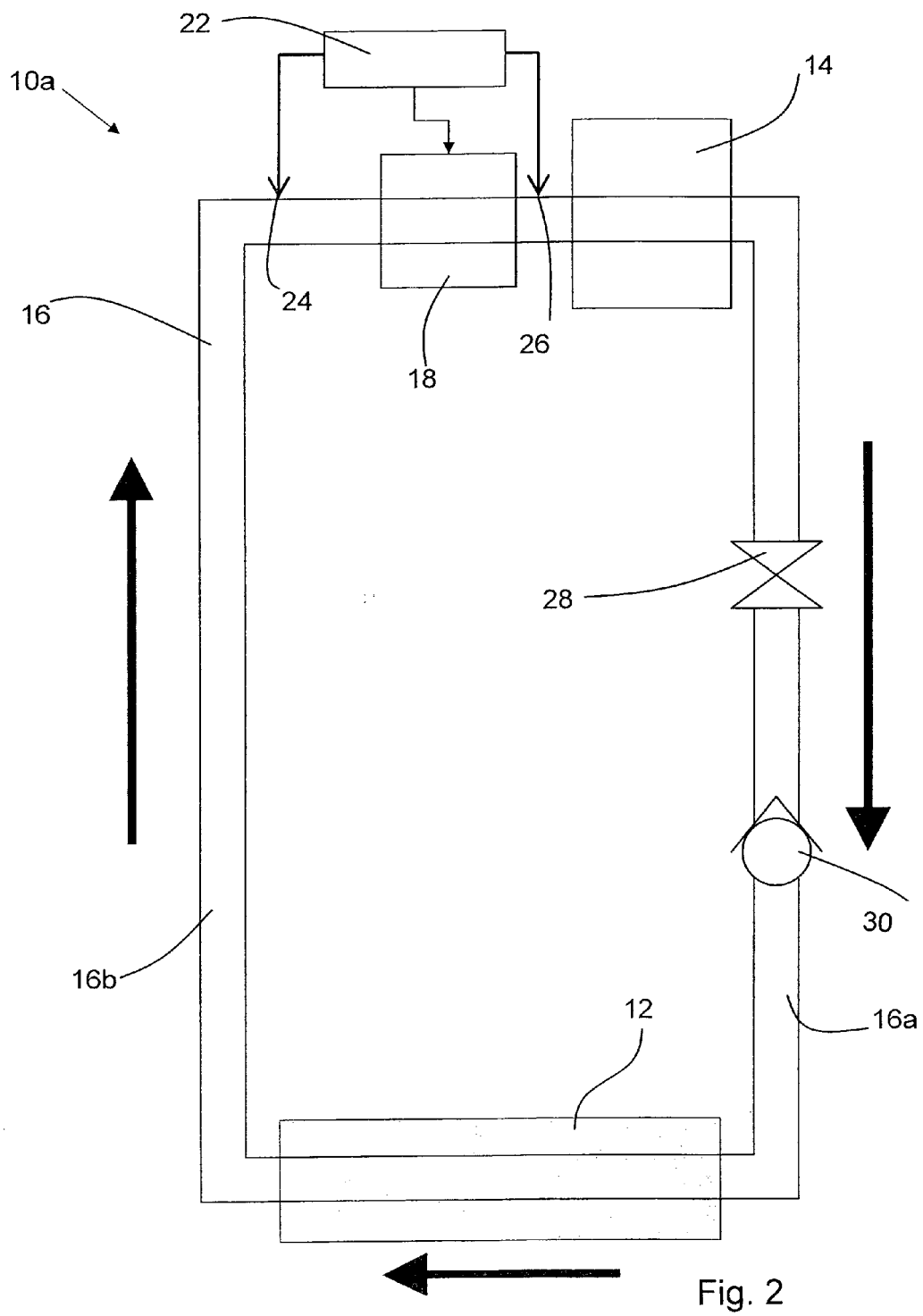
FIG. 2 is an illustration of a second embodiment of a power generation system according to the invention.

With reference to FIG. 2, an alternative configuration of a power generation system according to the invention is indicated at 10a. Reference numerals have been re-used from the embodiment of FIG. 1 to indicate similar components. In the embodiment of FIG. 2, the controller 22 is coupled with the power transfer system 18. In this case, the controller 22 is operable to regulate the operation of the power transfer system 18, for example, to control the load that the power transfer system 18 is exposed to, which accordingly controls the pressure difference experienced by the working fluid at the power transfer system 18. For example, where a volumetric turbine is used, the controller 22 may be adapted to control the load on the turbine (e.g., from an electric generator), which consequently controls the speed of operation of the turbine. Control of the speed of the turbine accordingly controls the pressure drop experienced by the working fluid as it exits the turbine, such that accurate control of the turbine operation can prevent state changes of the working fluid on exiting the turbine.

It will be understood that any configuration of pressure regulation means may be employed, i.e., any suitable combination of choke valves and control of the power transfer system 18.

It will be understood that a system may be employed having first and second choke valves at either side of a power transfer system 18 comprising a turbine, with the operation of the choke valves and the power transfer system 18 regulated by controller 22. Such a system can accordingly regulate turbine inlet flow, the load that the turbine is exposed to, and the back pressure behind the turbine (to prevent flashing to vapor). As a result, this system is operable to maximize the load on the turbine, without allowing the fluid to flash to vapor as it exits the turbine. This reduces the energy consumed by the system itself, and accordingly increases the overall efficiency of the power generation system.

Additional features are illustrated in the embodiment of FIG. 2, which it will be understood may be applied to any embodiment of the present invention.

The power generation system 10a further comprises a secondary or supplementary choke valve 28. The supplementary choke valve 28 is provided in the first pipe 16a, but may also be provided at the bottom of the fluid communication circuit loop 16, i.e., adjacent to and before the heat source 12. In some cases, if the speed of descent of the cooled fluid from the upper elevation level to the lower elevation level is too high, a partial vacuum may be formed at the upper level, i.e., after the heat sink. Subsequent expansion of fluid to fill this vacuum may result in damage to the fluid communication circuit 16, e.g., a collapsed pipe. The use of a supplementary choke valve 28 in the first pipe 16a helps to regulate the speed of descent of the relatively heavy working fluid, and prevent over speeding of the fluid in the pipe which may damage the system.

A check valve (or non-return valve) 30 is further provided in the first pipe 16a. The check valve 30 only allows fluid to flow in one direction, i.e., in a downwards direction in the first pipe 16a, from the upper elevation level to the lower elevation level. This prevents any accidental reverse fluid flow in the first pipe 16a, and ensures that the working fluid is circulated in the fluid communication circuit 16 is the direction indicated by the arrows. It will be understood that check valves may be employed at different locations in the fluid communication circuit 16 to ensure the correct flow direction of the working fluid.

It will be understood that the heat source 12 may be any suitable heat generation device, e.g., a geothermal heat source, electric heating elements, fuel burners, etc. Furthermore, heat sink 14 may be any device suitable of extracting heat from a system, e.g., the heat sink may be a heat exchanger device coupled with a the heating system of a building, a local area district heating system, etc. Furthermore, the heat sink 14 may be coupled with the heat source 12. In such a case the induced heat is re-used in the system using a secondary heat exchanger, having a second fluid communication loop extending from the heat sink 14 to the heat source 12, wherein the heat extracted by the heat sink 14 is re-supplied to the heat source 12. Accordingly, the heat source 12 essentially recycles most of the heat used in the system, with additional heating means required to replenish the heat lost in the system to heat exchangers, the piping, to the environment, etc.

A pair of working examples of the operation of the power generation system 10, 10a is now provided.

A power generation system 10, 10a is provided utilizing a volumetric turbine as part of the power transfer system 18, wherein the upper elevation level is provided at surface level, and refrigerant fluid R134a is provided as the working fluid. R134a weighs 1.29 SG (specific gravity) at 0° C. and 0.512 SG at the critical temperature at 101.06° C. Providing a vertical loop with a depth of 1,000 meters from the upper elevation level to the lower elevation level, the first pipe 16a will have a pressure at the lower level of 1.29*1,000=129 Bar. The second pipe 16b will have a pressure of 0.512*1,000 meters=51.2 Bar. The net pressure at the upper elevation level will be 129 Bar−51.2 Bar=77.8 Bar, which is what will be seen by the volumetric turbine.

In a system wherein a secondary heat exchanger is used, connecting the heat sink 14 to the heat source 12, essentially the heat in the system is taken out at the surface level after the turbine, and reused back at the bottom of the circuit. The net operating "cost" of energy consumption will be:

The heat loss in the heat sink (i.e., the heat exchanger) on surface;
The loss of heat transport to the bottom of the loop;
The frictional losses in the circulating system; and
Turbine efficiency.

R134a expands 2.5275 times as it is heated from 0° C. to 101.6° C. This means that the turbine will "see" 252 liters of fluid per 100 liters provided at the "cold side" (i.e., the side of the first pipe 16*a*). Furthermore, by heating the R134a fluid beyond 101.6° C., it is possible to obtain a greater expansion of the fluid.

Preferably, the working fluid is heated to the critical temperature of the fluid, to maximize the temperature difference between the upper and lower elevations (i.e. to maximize the expansion of the fluid). Further preferably, the working fluid is heated to a supercritical temperature of the fluid. Heating of the fluid to such levels allows for much greater mechanical efficiency of the power transfer system 18, due to the increased expansion of the fluid, and accordingly the increased rate of fluid flow in the system. Such supercritical heating requires considerable regulation of the system conditions to prevent any state changes in the fluid, which can result in considerable energy losses to the system when reversing a state change.

In a second example, taking $CO_2$ as the working fluid, it is possible to operate a similar power generation system 10, 10*a*, albeit operating at lower temperatures (the critical temperature of $CO_2$ is 31° C.). Such lower-temperature operation allows the process to be run on a much wider range of heat sources, e.g., waste heat, low quality geothermal heat, garbage decomposition, garbage incineration and/or disposal, etc.

Liquid $CO_2$ at 0° C. has a SG of 0.9276, and at the critical temperature of 31° C., the SG is 0.4675. Using the same conditions as the example above with the 1,000 meter height difference, the pressure on the turbine will be 0.9276*1,000=92.76 Bar on the "cold" side and 0.4675*1,000=46.75 Bar on the "lukewarm" side. Accordingly, there is a pressure difference of 92.76-46.75=46.01 Bar, which is used for operating the turbine.

Using a liquid, such as $CO_2$, which has a boiling point lower than the normal temperature obtained after the turbine, it may be required to maintain a "backpressure" on the low pressure side of the turbine which is higher than the "boiling" pressure—otherwise, the fluid will flash to a vapor. For $CO_2$ at 0° C., this would be a pressure higher than 35 bar. This can be accomplished through accurate control of a second choke valve employed adjacent the outlet of the power transfer means 18. This backpressure will not reduce the efficiency of the system, as the pressure will work on both sides of the turbine, and therefore, not compromising the differential pressure. Also, the 35 bar backpressure behind the turbine will also result in a 35 bar 'pushing' pressure effect on the downward side, i.e., on first pipe 16*a*.

A $CO_2$-based system may be able to utilize, for example, low-depth geothermal sources, as a temperature difference of 38° C. can be found often at shallow depths.

While the above system can be used on a relatively small-scale, e.g., wherein the upper and lower elevation levels are provided at the upper and lower ends of a building, in preferred embodiments the height difference may be of the order of several hundred meters, e.g., disused oil wells, mountainsides, mining shafts, deep-sea installations, relatively tall buildings, purpose drilled boreholes, etc. In such cases, the height difference is may be at least 1,000 meters. In such a geothermal system, it is preferred to regulate the flow rate at the lower level of the system, in order to ensure that the heat extracted from the heat source is maintained at a constant steady-state level (e.g., that the heat source is not exhausted).

Examples of different uses of the system are now provided.

One preferred embodiment is to use a geothermal heat source available in many places in the world. A fluid, or combination of fluids, is selected as the working fluid to suit the heat source available, which will allow the heat source to bring the working fluid to the critical temperature of the fluid at the bottom of the system, e.g., in a discontinued oil well. One of the characteristics of such discontinued oil wells is that access to the bottom of the well is not available. In this case, a dual set of pipes may be used. The cold fluid may be pumped to the bottom of the well, and heated by the geothermal heat source before being returned to the surface. The second pipe (retuning the heated fluid to the surface) may be insulated. The system may also or alternatively include a single insulated double-chamber pipe, wherein the cold fluid is pumped down in the external annulus of the pipe at a relatively slow speed (thereby allowing more time for the fluid to be heated up) and returned up the smaller insulated pipe.

Another preferred embodiment is to use a location where access to the bottom of the loop is available. This may be in respect of mineshafts, mountainsides, tall buildings, etc., i.e. anywhere that there is a sufficient difference in height. By having access to the bottom of the loop, it is possible to arrange the heating of the working fluid through a number of different means, like electric coils, wood chip and pellet burners, biogas heaters, etc. The heat source is provided at the bottom of the fluid circuit and controlled from the surface. Such embodiments may employ the secondary heat exchanger system as described above, to re-use the heat in the system.

Another preferred embodiment includes a deep-sea installation, where two or more tubes are suspended in water to a sufficient depth. The cold part of the loop (i.e., first pipe 16*a*) may be exposed to the temperature of the seawater, while the heated part of the loop (i.e., second pipe 16*b*) is insulated to prevent cooling while travelling to the surface. The advantage of deep sea installations is that loops of any size can be installed; as well bores are not required to be drilled. Also, the increased scale of the system can compensate for a lack of depth. As depth and flow-rate are linked, accordingly a system having a 1,000 meter height difference and a resultant flow rate of 350 m³/hour provides the same turbine power as a system with a 500 meter height difference with a flow-rate of 700 m³/hour.

The system may also be utilized with purpose built boreholes, which contain the fluid circuit including the working fluid, as well as a secondary loop for the above-described secondary heat exchanger system. Such an embodiment may be designed for the specific requirements of the location and the materials used to ensure maximum efficiency.

In a further example, a $CO_2$ underground storage system may be combined with the system of the invention to generate power. A typical $CO_2$ storage system stores liquid $CO_2$ at a depth of not less than 1,000 meters. As the temperature gradient in many areas of the world is approximately 30° C. per kilometer depth, a depth of 1,000 meters will yield a temperature of 38° C. (assuming that the surface temperature is 8° C.). At 38° C., $CO_2$ is at its critical temperature, and is ready to be used as an energy carrier. Accordingly, in such a system, the $CO_2$ is allowed to rise from the storage area. The liquid $CO_2$ is then routed through a volumetric turbine to generate power which can be harnessed for external use. The "spent" $CO_2$ can then be returned to the lower-level storage area, or the $CO_2$ can be heat exchanged and the heat reused (as in the above-described secondary heat exchanger circuit) prior to re-injecting to storage.

The invention is not limited to the embodiments described herein, and may be modified or adapted without departing from the scope of the present invention.

What is claimed is:

1. A power generation system comprising:
   a heat source provided at a first location;

a heat sink provided at a second location, wherein said second location is elevated relative to said first location;

first fluid communication means extending from said heat sink to said heat source;

a power transfer system in fluid communication with said heat sink; and second fluid communication means extending from said heat source to said power transfer system, wherein said fluid communication means are operable to circulate a thermally expandable fluid in a loop between said first and second locations, said fluid circulated from said first location, where it is heated and expanded by said heat source, in an upwards direction through said second fluid communication means to said second location, where it passes through said power transfer system and is cooled and contracted by said heat sink, and in a downwards direction through said first fluid communication means back to said first location, the circulation of said fluid operable to drive said power transfer system to generate power, characterised in that said power generation system further comprises a pressure regulation means wherein said regulation means is operable to regulate a pressure difference experienced by the fluid at said power transfer system to prevent said fluid flashing to a vapour.

2. The power generation system of claim 1, wherein said first fluid communication means and said second fluid communication means form a closed fluid communication circuit.

3. The power generation system of claim 1, wherein said power transfer system is provided at said second location.

4. The power generation system of claim 1, wherein said pressure regulation means comprises at least one choke valve.

5. The power generation system of claim 4, wherein at least one choke valve is located at an inlet of said power transfer system, said choke valve operable to regulate the rate of fluid flow into said power transfer system from said second fluid communication means.

6. The power generation system of claim 4, wherein at least one choke valve is located at an outlet of said power transfer system, said choke valve operable to regulate the rate of fluid flow out of said power transfer system for communication to said heat sink.

7. The power generation system of claim 1, wherein said pressure regulation means is operable to control the operation of said power transfer system to regulate the rate of fluid flow through the power transfer system.

8. The power generation system of claim 1, wherein said power transfer system comprises a volumetric turbine.

9. The power generation system of claim 1, wherein the system further comprises a secondary choke provided in said first fluid communication means, said secondary choke operable to regulate the rate of flow of fluid from said second location to said first location.

10. A method for generating power, the method comprising the steps of:
(a) heating a thermally expandable fluid at a first location, to convey the relatively lighter heated fluid in an upwards flow direction from said first location;
(b) driving a power transfer system using said fluid flow to generate power;
(c) cooling said fluid at a second location, said second location elevated relative to said first location, said cooling acting to convey the relatively denser cooled fluid in a downward flow direction from said second location to said first location, and
(d) repeating steps (a)-(c) to circulate said fluid in a power generation loop, wherein in that the method further comprises the step of:
regulating a pressure difference experienced by the fluid at said power transfer system to prevent said fluid flashing to a vapour.

* * * * *